United States
Jacobs

[11] 3,782,176
[45] Jan. 1, 1974

[54] APPARATUS FOR MEASURING VIBRATION IN A MOVING OBJECT
[75] Inventor: Gordon B. Jacobs, Manlius, N.Y.
[73] Assignee: General Electric Company, Syracuse, N.Y.
[22] Filed: Mar. 30, 1972
[21] Appl. No.: 239,680

[52] U.S. Cl. ................................................ 73/71.3
[51] Int. Cl. .............................................. G01b 9/02
[58] Field of Search ...................... 73/67.5 H, 71.3, 73/71.5

[56] References Cited
UNITED STATES PATENTS
3,523,735    8/1970    Taylor.................................. 73/71.3

OTHER PUBLICATIONS
Whitman & Korpel, "Probing Acoustic Surface Perturbations..." Applied Optics, Aug. 1969, pp. 1567–1576.

*Primary Examiner*—Richard C. Queisser
*Assistant Examiner*—Arthur E. Korkosz
*Attorney*—Richard V. Lang et al.

[57] ABSTRACT

Apparatus is disclosed for measuring small vibrations in an object that is in overall motion in relation to the measuring apparatus. The apparatus employs coherent optical comparator techniques which produce a shift in the optical frequency of a laser beam as a result of motion of one object surface in relation to another object surface. A Bragg modulator is employed in an optical heterodyne technique to convert the frequency terms expressive of object vibration into a convenient electrical format. The apparatus includes means for forming the coherent illumination into a large fan-shaped beam through which the vibrating object may move without imprecision in vibration measurement.

9 Claims, 7 Drawing Figures

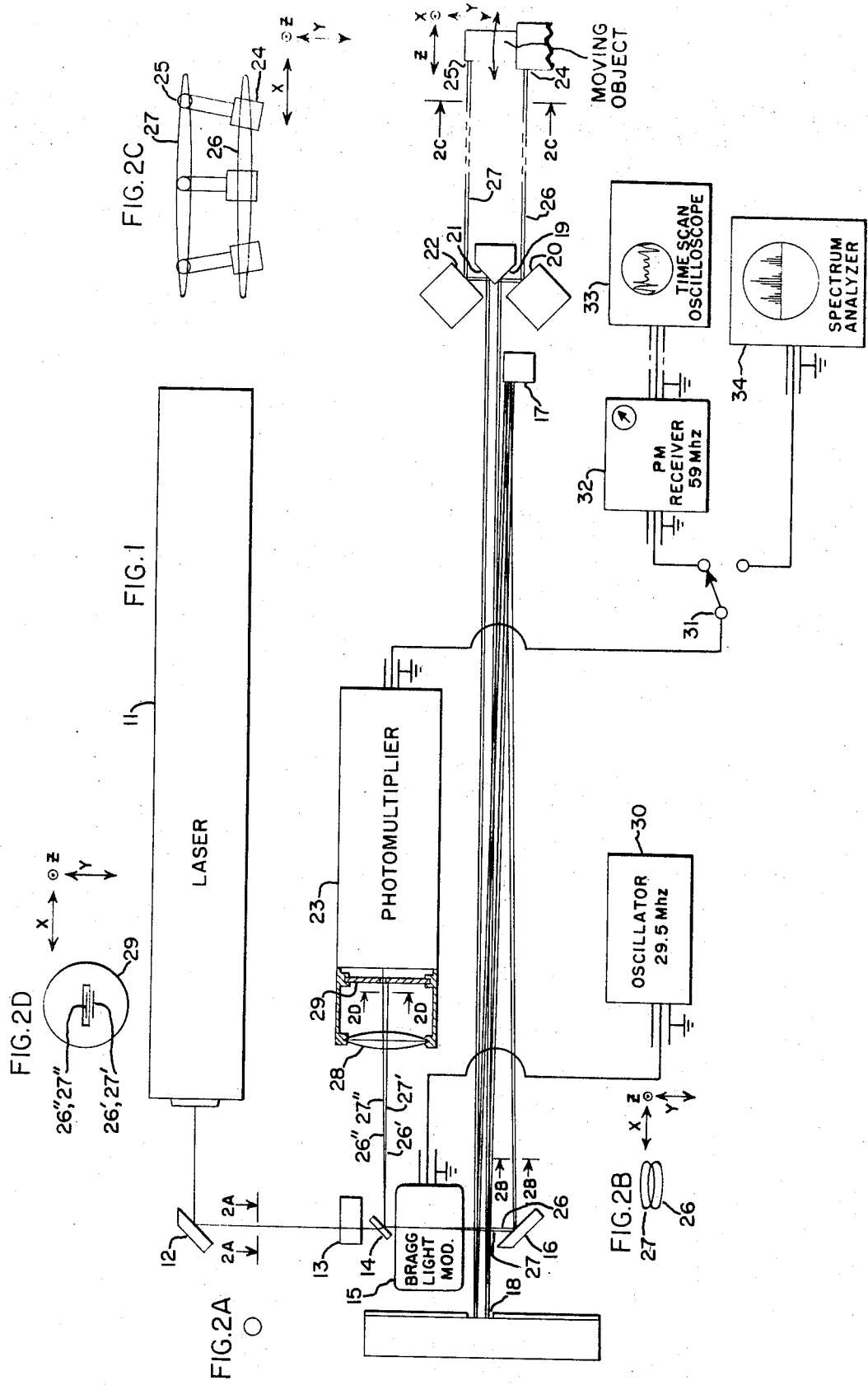

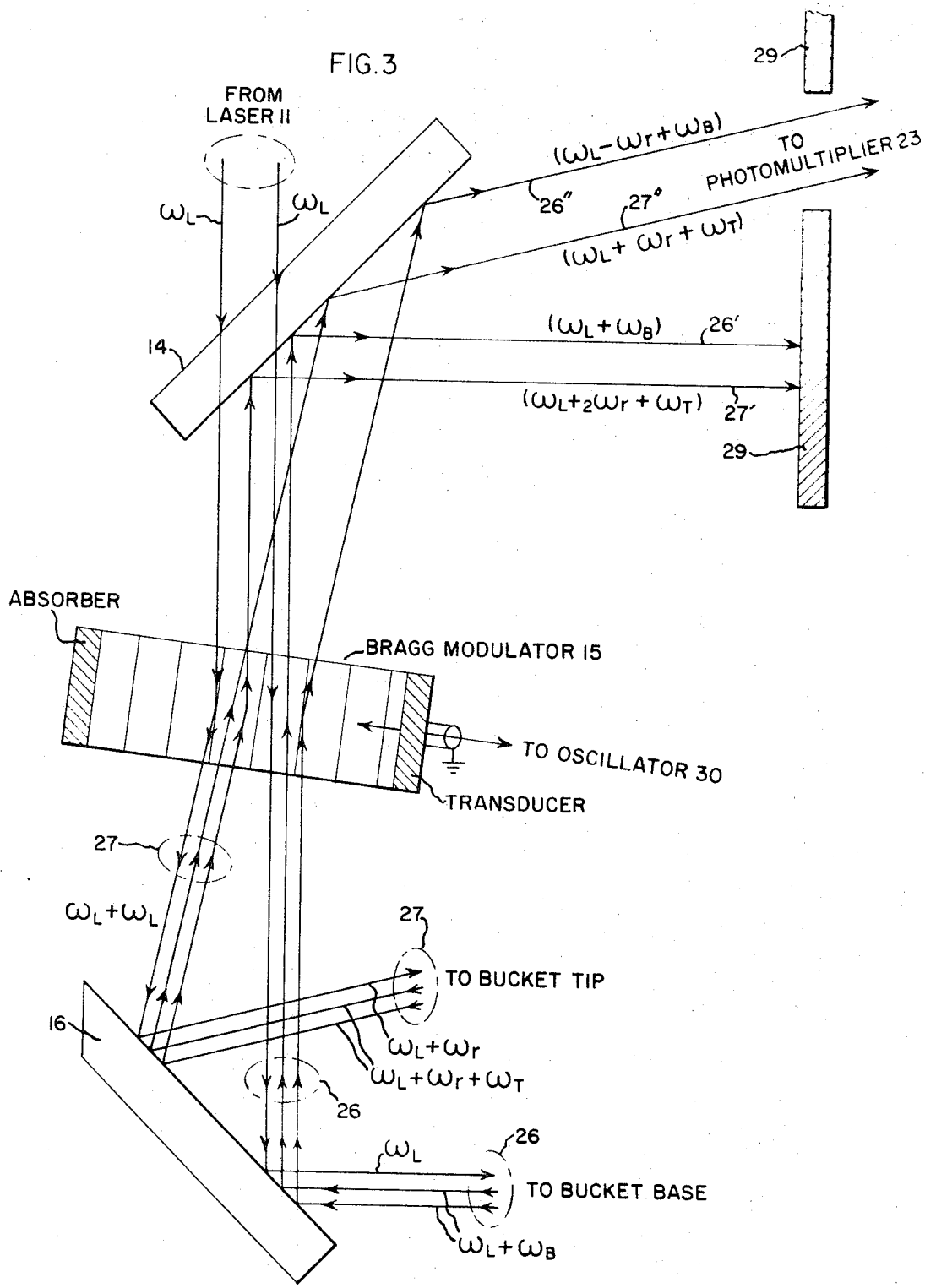

3,782,176

APPARATUS FOR MEASURING VIBRATION IN A MOVING OBJECT

BACKGROUND OF THE INVENTION

1. Field of the Invention

The present invention relates to the art of measurement of small vibratory motions. It also relates to the art of optical measurement of motion using coherent light, wherein optical heterodyning is used to convert the motion information to a low frequency format convenient for electrical measurement.

2. Description of the Prior Art

With the advent of convenient sources of coherent light, it has become possible to employ light wave phenomena in many common measurements. A very common technique is the use of wave interference phenomena which create visible interference patterns and moire fringes. These techniques have been used to measure static distortions and vibrations in those small dimensions which are conveniently measured at integral or fractional wavelengths of the light employed.

Another measurement technique involving coherent wave phenomena is also known. This technique employs the Doppler frequency shifts which occur when waves interact with moving surfaces. One physical realization of this technique has involved the recombination of a laser beam which has been reflected from a moving surface with the original laser beam at the photocathode of an electron multiplier or upon a photodiode. When the two beams are suitably recombined and certain other conditions met, a beat frequency may be produced in the electrical output of the light sensitive device at the Doppler frequency. These light sensitive devices are non-linear in their electrical output, typically being square law devices and readily produce intermodulation terms. The direct beat approach has posed certain difficulties which are largely avoided by an additional conversion step employing a Bragg modulator. The Bragg modulator may conveniently shift the optical frequency of a coherent source 20 – 30 megacycles, with the frequency shift being either up or down dependent upon the mode of entry of the light into the Bragg modulator. Using the Bragg modulator and creating an optical heterodyne makes it convenient to obtain a wave containing surface motion information in the form of frequency or phase modulation which is mixed with the Bragg modulator frequency (or its double). Typically, the surface motion produces frequency modulation terms of from 10 – 200 kilocycles.

Such an arrangement has been proposed in *Applied Optics*, August, 1969, pages 1566 – 1576 in an article by Whitman et al. entitled "Probing of Acoustic Surface Perturbations by Coherent Light." In one heterodyne arrangement described in that article, a photodiode is employed to create low frequency heterodyne terms as a vibrating piezoelectric crystal is illuminated with coherent light. A Bragg modulator is employed to produce both forward and backward transit frequency shifts of the coherent light, with one laser beam being directed to the moving crystal surface and another beam to an arbitrary stationary surface. The crystal was supported in a holder which was fixed with respect to the measurement apparatus.

SUMMARY OF THE INVENTION

It is an object of the present invention to provide an improved apparatus employing coherent light for the measurement of object vibration while the object is in motion with respect to the measuring apparatus.

It is another object of the present invention to provide an improved apparatus using coherent optical techniques for the measurement of vibration in a direction perpendicular to the beam, which apparatus is insensitive to displacement of the object as a whole along said beam.

It is a further object of the present invention to provide an improved apparatus using coherent optical techniques for the measurement of vibration within an object in a direction perpendicular to an incident beam, which permits lateral displacement of the object along a line perpendicular to said beam.

It is still another object of the present invention to provide an improved apparatus employing coherent optical techniques for the measurement of vibration of a turbine bucket while the bucket is in motion upon a rotating turbine wheel.

It is a further object of the present invention to provide an improved apparatus using coherent optical techniques for the measurement of object vibration having improved means for calibration.

These and other objects of the invention are achieved in a novel coherent optical comparator for measuring the relative motion of one flat reflective surface on an illuminated object in respect to another substantially parallel flat reflecting surface in a direction perpendicular to said surfaces. The comparator permits the object to move as a whole in relation to the apparatus while measuring the relative motion. The comparator comprises a light modulator of the Bragg type, a source of collimated coherent illumination directing a beam into said modulator to form a first deflected beam, frequency shifted by an amount equal to the Bragg modulation frequency and a second non-deflected, non-frequency shifted beam; means to direct said frequency shifted first beam into perpendicular incidence with one of said reflective surfaces to effect an additional frequency shift resulting from its motion and to cause the reflected beam to return back upon itself; means to derive a second beam from said source substantially parallel to said second beam and directed into perpendicular incidence with the other of said reflective surfaces to effect a frequency shift resulting from its motion and to cause the reflected beam to return back upon itself; optical means to direct said return beams into a common path; and light detection means disposed in said common path for recovering the optically heterodyned electrical signal corresponding to the light modulation frequency terms mixed with the surface motion frequency terms.

In accordance with another aspect of the invention wherein the optical comparison is applied to an object moving a substantial distance in a direction orthogonal to the beams incident on said surfaces, said apparatus further comprises a first cylinder lens for spreading the illumination from said source to widen said first and second beams in a direction orthogonal to the plane defined by said beams; and a common optical element for collimating both widening beams at a width to permit object illumination over said orthogonal distance. The second beam is preferably derived from the non-deflected beam from said light modulator, with the first cylinder lens being disposed between the source and the light modulator. In accordance with a further aspect of the invention, the return beams are directed back into the Bragg modulator for a second time, so that each return beam is split into a deflected and a non-deflected component, with one component from each return beam coinciding in a first common path, lying in a non-deflected axial position, and one component from each return beam coinciding in a second common path, deflected from said axial position, with said light detection means being disposed to select the components in one of said common paths.

The common collimating element is preferably a concave parabolic mirror of high quality with said two separated beams being disposed approximately symmetrically about the center of said mirror so that adjacent portions of the beams experience substantially like waveform distortions since they impinge on adjacent mirror surfaces when going toward and returning from the object surfaces.

In order to accommodate paired object surfaces of different spatial separation, a periscope-like arrangement of translatable mirror pairs are provided.

In order to permit extremely fine measurements of the vibrational dimensions both an oscilloscope and a spectrum analyzer are provided for analyzing the electrical output of the light detection means. Use of the vibration amplitudes of separate modulation terms derived from the vibration analyzer permits one to directly compute the amplitude of vibration without direct mechanical (or other optical) measurement.

BRIEF DESCRIPTION OF THE DRAWING

The specification concludes with claims particularly pointing out and distinctly claiming the subject matter which is regarded as the invention. It is believed, however, that both as to its organization and method of operation, together with further objects and advantages thereof, the invention may be best understood from the description of the preferred embodiments, taken in connection with the accompanying drawings, in which:

FIG. 1 is an illustration of an optical comparator embodying the invention. FIG. 1 includes an optical schematic of the optical components of the comparator and the principal electronic components;

FIGS. 2A, 2B, 2C and 2D are auxiliary views of the beams used in the optical comparator taken at sections A—A, B—B, C—C and D—D of the FIG. 1 apparatus;

FIG. 3 is a plan view of an optical schematic of the portions of the apparatus in which beam modulation and beam separation take place.

DESCRIPTION OF THE PREFERRED EMBODIMENT

Figure 4:
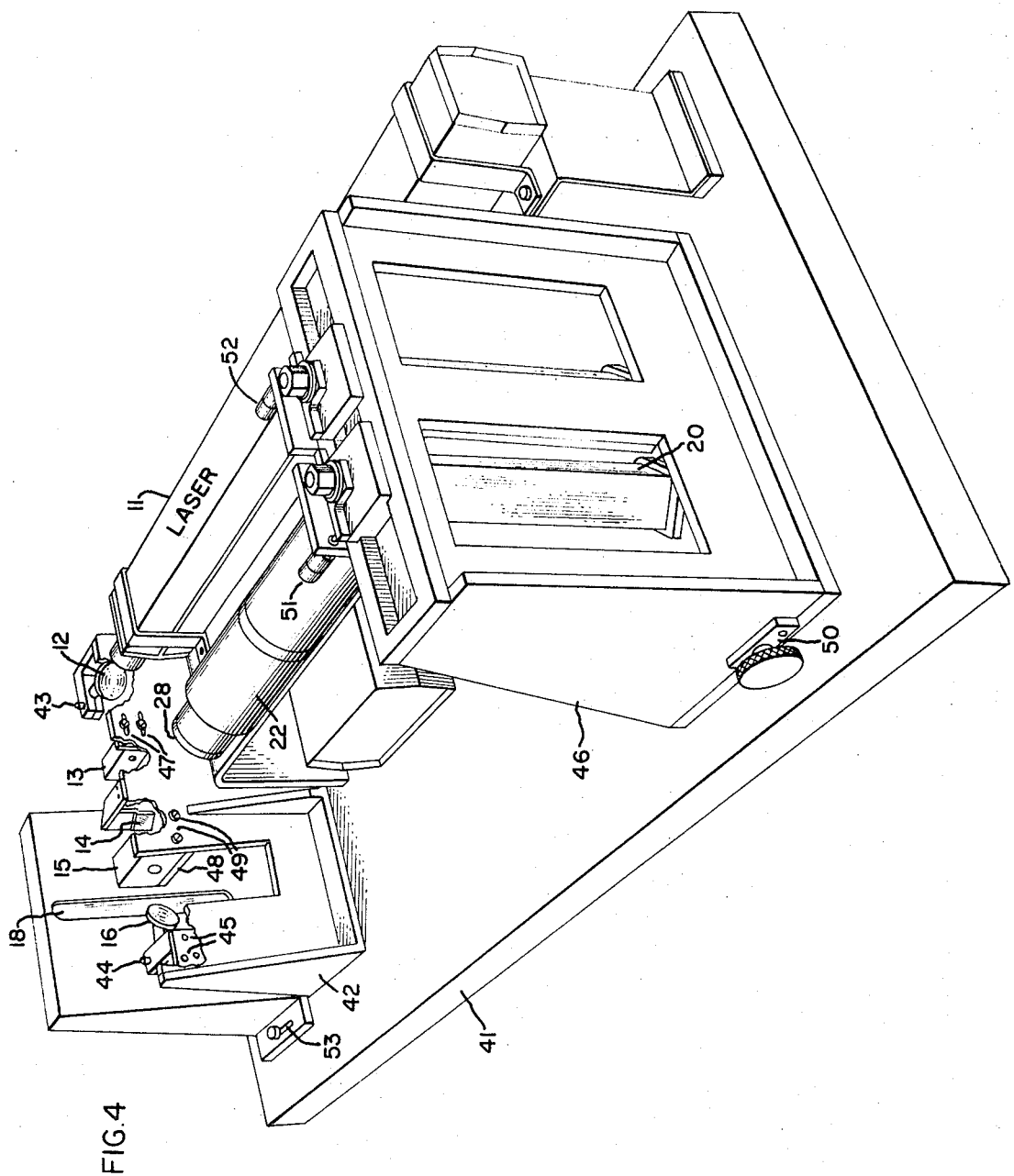
FIG. 4 is a perspective view of a practical apparatus used for measuring turbine bucket vibration.

In FIG. 1 there is illustrated an optical comparator for measuring small vibrations. It has as its principal optical components a laser light source 11, a first planar mirror 12, a cylinder lens 13 for vertically expanding the laser beam, a beam splitting mirror 14, a Bragg light modulator 15, which converts the beam into two component beams 26, 27, one beam (27) being frequency modulated; two additional planar mirrors 16 and 17, a concave parabolic reflector 18 for collimating the vertically expanding beams, two pairs of planar mirrors 19, 20 and 21, 22 and finally the photomultiplier 23. The photomultiplier 23 further includes an objective lens 28 and a spatial filter or stop 29 for selecting a single return beam. These optical elements, except for the detector 23 and its components 28 and 29, have been recited in the general order of their position along the path of light from the laser to the object surfaces under examination. The two outgoing beams 26, 27 developed in the modulator 15 impinge on the reflective surfaces 24 and 25 of the object.

The comparator has the following electronic components connected as follows for electrical energization and to provide a visual indication of object surface motion. The laser 11 is provided with a suitable power supply not shown. A power supply, also not shown, is provided for the photomultiplier 23. The Bragg modulator 15 is provided with an oscillator 30 which produces a sinusoidal wave at 29.5 MHz for operating the modulator. The photomultiplier 23 receives an optical signal input and produces an electrical signal output. Its optical input has been discussed above. Its electrical signal output is fed through a selector switch 31 to one of two optical displays. When the switch is set in the upper position, the electrical signal from the photomultiplier 23 is fed to a phase modulation receiver 32 tuned to twice the oscillator frequency (59 MHz). The output of the receiver 32 is fed to the oscilloscope 33. The oscilloscope produces a "time scan" output waveform whose amplitude indicates the magnitude of surface vibration and whose frequency indicates the frequency of surface vibration. When the switch 31 is placed in its lower position, the electrical output of the photomultiplier 23 is fed to a spectrum analyzer 34 which illustrates the component surface vibration as a "spectral scan." In this mode of visual display, the vibration components are separately shown at their respective amplitudes. When a simple measurement is desired, the time scan oscilloscope output 33 produces the customary output indication. For calibration, or for a more detailed study of the nature of the vibration, the spectrum analyzer 34 is emoloyed.

The optical comparator permits a very sensitive evaluation of object motion in one selected respect, undistributed by a very substantial dynamism in other respects. The apparatus senses the time rate of change in the light path from the apparatus to the object surfaces by measurement of the Doppler shift in the optical frequency. As seen in FIG. 1, the component of motion being studied is along the Z dimension parallel to the beams 26, 27 exiting from the apparatus. Using two beams in a comparison technique permits the apparatus to sense flexure to approximately $10^{-7}$ inches along the Z dimension as between the surfaces 24 and 25, while ignoring joint translation of both surfaces along the same Z dimension. This sensitivity is also retained for X and Y object translations which are small relative to the dimensions of the surfaces 24 and 25. At the same time, vertically expanding the laser beam permits the object surfaces to move jointly very substantial distances in a direction perpendicular to the plane of FIG. 1 (the X dimension).

In a practical embodiment, turbine bucket vibration in the Z dimension is the aspect of the motion being studied. The apparatus compares the motion of the bucket tip with respect to the base — and thus senses flexure or distortion of the bucket per se. The Z dimension is chosen parallel to the axis of the turbine wheel upon which the bucket is mounted. The turbine wheel and the bucket may be subject to a large number of dynamic irregularities resulting from bearing imperfections and the like producing axial motion of the wheel and the bucket as a whole. The comparison technique, however, discriminates against motion of the kind in which the top and bottom surfaces of the selected bucket move jointly. The vibration of a bucket may be observed over a substantial number of vibrational periods by use of the fan beam which allows a given bucket to be kept under observation for up to eight inches of X dimension translation as the wheel upon which the bucket is mounted rotates.

Returning now to a more detailed consideration of the optical aspects of FIG. 1, light leaving the laser 11 successively passes mirror 12, cylinder lens 13 (initiating vertical beam expansion) and the beam splitter 14 before impinging upon the light modulator 15. In the modulator 15, the light is separated into the mutually displaced beams 26, 27 one on-axis and the other off-axis, respectively, which then impinge at closely spaced points upon the planar mirror 16, the planar mirror 17 and upon the vertical collimating mirror 18. After reflection from the collimating mirror 18, the two mutually displaced beams are fully expanded vertically and separated enough laterally to fall on the separate mirror surfaces 19, 20, 21 and 22. The on-axis beam 26 is reflected by the lower mirror pair 19, 20 to impinge on the bucket base 24 while the off-axis beam 27 impinges on the mirror pair 21, 22 and the bucket tip 25.

The on-axis beam 26, after reflection back from the object surface 24, follows its prior path until reaching the modulator 15. In the modulator, the on-axis return beam 26 is itself separated into components 26' and 26" which impinge on the beam splitting mirror 14 and are partially reflected toward the photomultiplier 23. Parts of both returning components pass through the beam splitting mirror toward the laser and are lost. The objective lens 28 and the mask 29 intercept the on-axis return component 26' but accepts component 26" into the photomultiplier 23.

The off-axis beam 27, after reflection back from the object surface 25 also retraces its prior path until reaching the modulator 15. At this point the beam 27 is also separated into two components, one deflected to now become on-axis (27') and the other component 27" remaining off-axis at the deflection angle. Both beam components impinge upon the beam splitting mirror 14 where portions of each pass through to the laser and are lost, while portions of each are also reflected toward the photomultiplier 23. The lens 28 in the photomultiplier 23 focuses and demagnifies the return beams 27' and 27" to permit their spatial separation in a relatively short distance from the modulator, and the mask 29 blocks the on-axis component 27', while permitting the off-axis component 27" to impinge on the photodetector.

The Bragg modulator 15 imparts a frequency shift in the deflection process whose sign depends upon the direction and angle that the light passes through the modulator. The paths of the outgoing and return beams through the Bragg modulator and their respective frequency shifts are depicted in FIG. 3 with some exaggeration of the angular deflection. Lens 28 is also omitted. The beam from the laser 11 is at the light frequency $\omega_1$. The portion of the outgoing beam which is undeflected in the Bragg modulator 15 becomes the on-axis beam 26. The beam 26 is shown resolved into three components, the outgoing component at frequency $\omega_1$ and two components returning after deflection from the bucket base at a frequency $(\omega_1 + \omega_b)$, the $\omega_b$ term implying a Doppler frequency shift resulting from reflection from the turbine bucket base. One of these return components continues through the modulator 15 without deflection and becomes the on-axis term 26' of frequency $(\omega_1 + \omega_b)$, which is intercepted by the mask 29. The other return component is deflected as it returns through the Bragg modulator 15 to now become the off-axis return beam 26". It is reflected through the slit in the mask to the photodetector 23. Assuming sonic wave propagation in the Bragg modulator directed to the left in FIG. 3, the deflection process reduces the frequency of the return beam 26' to $(\omega_1 - \omega_r + \omega_b)$, where $\omega_r$ is the frequency shift resulting from the Bragg modulator.

The beam 27 is shown resolved into three components, the initially deflected outgoing beam which now has a frequency $(\omega_1 + \omega_r)$ (assuming the same Bragg modulator conditions as above) and two return components, both of which have a frequency $(\omega_1 + \omega_r + \omega_t)$, where the term $\omega_t$ corresponds to the frequency modulation resulting from reflection from the bucket tip. The two return components pass through the Bragg modulator 15. One return component 27" passes through without deflection and is reflected through the slit to the photomultiplier 23. The other return component 27' is deflected in the modulator 15 back to an on-axis position and is intercepted by the mask 29. The frequency of 26' now becomes $(\omega_1 + 2\omega_r + \omega_t)$, the $2\omega_r$ term denoting a double frequency shift at the Bragg modulation frequency.

Thus, it may be seen that the upper pair of return beams 26" and 27" are electrically distinguishable as they are spatially superimposed in the detector 23 and (ignoring object surface motion) provide a low frequency beat ($2\omega_r$) well below optical frequencies and equal to twice the individual frequency shifts in the modulator. This beat frequency in effect furnishes a convenient carrier for the lower frequency Doppler modulation terms ($\omega_b$ and $\omega_r$) arising from object surface motion at 24 and 25.

The terms 26' and 27' are also superimposed and impinge on the mask 29. Their frequency difference is also $2\omega_r$ (plus the object motion terms), in practice, one may also employ these two return components, if the terms 26" and 27" are masked.

A convenient Bragg frequency is 29.5 megahertz. Normal turbine bucket motion causes modulation terms ($\omega_t - \omega_b$) which tend to fall under 500 Kc.

The mirrors 12, 16, 17 and the beam splitter 14 fold the optical system down to a minimum overall dimension consistent with the required optical performance. Since the laser is itself elongated, it sets the minimum length and thus defines the axis about which the folding occurs. An initial 90° fold to the laser beam is provided by the first mirror 12 disposed at the output of the laser. The mirror element 16 following the demodulator 15 completes the initial (180°) fold by adding a second bend of 90°. The flat mirror 17 and the concave collimating mirror 18 provide the second and third folds. In a practical embodiment the focal length of the large collimating mirror 18 is 64 inches, while that of the small cylinder lens 13 is nominally 1 inch. For collimation, they are arranged so that their foci coincide. This makes the optical path between the lens elements 16 and 18 65 inches consistent with an equipment axis of about 3 feet.

The parabolic mirror 18 has a diameter of 8 inches, giving a relative aperture of f8 with its 64 inch focal length. This diameter establishes the vertical dimension of the expanded beams 26, 27 at approximately 8 inches. The cylindrical lens 13 is positioned to form a slightly larger beam than the parabolic mirror will accept, the input relative aperture thereof being approximately f6. The relative aperture of the total system is to a substantial degree dependent upon the cone of light that available Bragg modulators will accept. Since the output aperture of the Bragg modulator is quite small in relation to the width of the modulator, the lens 8 is arranged to have a cross-over in close proximity to the Bragg modulator. To achieve the maximum aperture, the intervening beam splitter 14 is arranged to require minimum space.

For proper operation it is required that the two outgoing beams 26 and 27 originating in the Bragg modulator 15 be fully separated at the output mirrors 19 and 21. The angles between the deflected and undeflected components formed in the modulator 15 are quite small, being typically about one-half degree. Thus, depending upon the beam width, appreciable distance for spatial separation may be required. The laser beam is slightly more than ⅛ inch in cross-section as it impinges on the cylinder lens 13 and while its vertical dimension grows substantially as one proceeds along the system, the horizontal dimension remains about the same as when it left the laser 11. As the two beams progress along the axis of the system from the second mirror 16 to the third mirror 17 and from there to the parabolic reflector 18, the initial separation continues. The effect of the parabolic mirror 18 is small upon beam separation, tending in one practical embodiment to make the individual beams slightly smaller in width and thus aiding in beam separation at certain object distances. In the practical embodiment under discussion, the outgoing beams 26, 27 separate within the apparatus at about the mirror surface 17 and continue to remain separate as they impinge upon the object surfaces 24, 25.

While superposition of the selected pair of components 26″ and 27″ of the return beams traversing the Bragg modulator 15 must occur at the photomultiplier 23, separation from the undesired components 26′ and 27′ must also occur at that point. While one could allow a distance for return beam separation equal to that allowed for the outgoing beam, the photomultiplier 23 readily accepts a demagnified beam so that by use of a demagnifying lens 28, the length requirement is reduced. The lens 28 demagnifies the two beams in the width dimension in particular so that they can be separately resolved at the photomultiplier within less than a foot of the Bragg modulator. Once separated, the undesired return beam components 26′ and 27′ may be intercepted by the mask 29.

The slot in the mask 29 is elongated since at this point in the optical system the return beams occupy a larger vertical than horizontal dimension. Had the beam been returned through the cylinder lens 13, the return beam would approximate the circular cross-section of the original laser beam and its position would be independent of turbine wheel rotation. When the turbine bucket is stationary, the small circular spots at the turbine bucket surfaces 24, 25 appear as small spots on the photomultiplier. As the bucket advances through the fan beams 26, 27, however, these spots move up and down along the slot. When the turbine rotor is rotating rapidly, blurring causes the eye to see an elongated spot. If one restricts the vertical extent of the slots in the mask 29, the ends of the slot become field stops restricting the use of the extremities of the fan beams 26, 27. Typically, the slot is one-half to three-fourths of an inch in length to embrace the full extent of spot travel. The beams 26″, 27″ and 26′, 27′ and their disposition in relation to the slot in mask 29 are shown in FIGS. 2D and 3.

As pointed out earlier, the apparatus ignores very substantial dynamism of a body under study. In application to turbine bucket vibration, the bucket may be translated along the perimeter of the turbine wheel for several inches at near supersonic speeds while its vibration is being observed to a fraction of a wavelength of light. This facility for ignoring translation in the X dimension is achieved by the vertical beam expansion provided by the cylinder lens 13 and the parabolic mirror 18. It is done without loss of interferometric accuracy in measuring body flexure in the Z dimension.

The laser beam has an initially circular cross-section as shown in FIG. 2A. It also has a common phase wavefront which may be adjusted to be quite flat. The cylinder element 13 focuses the beam vertically at a point in proximity to but not directly on the beam splitter 14. (It should be at the focus of the parabolic mirror 18.) After passing through the lens 13, the lateral beam dimensions ideally remain as before. The cylinder element, due to practical limitations in accuracy, has a generally disruptive effect upon the common phase wavefronts.

As the laser beam proceeds through the Bragg modulator 15 and is separated into two component beams, the beams begin their vertical expansion (the X dimension) as shown in FIG. 2B. Upon reaching the parabolic mirror 18 the expansion is complete, and from that surface on for a very substantial distance, the separate beams will assume the approximate configuration shown in FIG. 2C. When the fan beams shown in FIG. 2C are made tangential to the turbine bucket path, study of turbine bucket vibration, comparing the Z vibration of the outer end of the bucket to its base may occur over the width of the two beams.

How interferometric precision is achieved in measuring axial (Z) bucket vibration requires a finer understanding of the underlying optical phenomena. As indicated above, light leaving the cylinder lens 13 is of relatively poor optical quality since it is normally impractical to preserve interferometric accuracy in a cylindrical lens element. The same phase distorted beam, however, is split horizontally into two closely spaced beams by the modulator 15, and these two beams are used in the two branches of the comparator. These two beams are found to have essentially the same phase distortion as one proceeds along the X dimension. Thus, when two segments from the two beams each having the same X dimension are used in the comparison process, these phase errors are self-compensating and congruence is not precluded.

The close phase correspondence required for precision is not appreciably worsened by the parabolic mirror 18. The mirror 18 is ideally a cylindrical rather than a spherical mirror with a parabolic section. In practice, however, a mirror of tolerable sphericity can be formed by using a narrow band of a conventional spherically ground long focal length parabolic mirror. Thus, while the mirror 18 provides unwanted horizontal focusing power, it produces the desired collimation along the vertical X dimension, and does so with minimum aberration of the phase fronts. The two "fan" beams 26, 27 impinge on two closely spaced adjacent regions of the parabolic mirror 18. Close juxtaposition on the mirror 18 and near symmetrical placement on the mirror matches residual errors in the mirror at equal X positions of the two beams, and minimizes differential distortion.

Thus, when the two beams 26 and 27 are created in the manner described, they preserve a very close phase correspondence at equal translations along the X dimensions of the beams. In other words, the two fan beams maintain phase congruence over small surface regions at a given X coordinate, making them suitable for use in the optical comparison process.

Because the optical frequency of the beams are translated in the Bragg modulator with respect to the other, this congruence cannot be directly observed by superimposing the two beams, even when the surfaces 24, 25 are stationary, but the beat can be detected in the photomultiplier 23.

The beat created by the superimposed images ideally creates alternating light and dark images at the rate of 59 megahertz. This rate of change is too fast for the eye to sense and normally is at the upper frequency limits of conventional photomultipliers. When certain operational precautions are taken, one may use a conventional photomultiplier. Normally, by using less than all the available signal dynodes, sufficient bandwidth is achieved with some sacrifice in sensitivity. The photomultiplier will not, of course, respond to optical frequencies. Thus, the low pass nature of the photomultiplier makes it eminently satisfactory for obtaining the radio frequency beat between two closely adjacent frequencies.

The X coordinate congruence between the two fan beams 26, 27 makes it possible to achieve interferometric accuracy in sensing Z component surface distortion while the two object surfaces move through large X displacements. In the case of the turbine bucket which is rotating on the perimeter of a turbine wheel having a relatively large radius, one may readily make an accurate comparison between two portions of the bucket. The first reflective surface 25 provided on the outer tip of the bucket is relatively small, while at the same time the reflective surface 24 provided at the base of the turbine bucket is slightly larger. Thus, as the bucket is rotated on the turbine wheel from the vertical (see FIG. 2C), the small circular spot at the tip, typically one-eighth inch in diameter, will have a counterpart at the same X coordinate in the larger surface below with which it retains phase congruence. The movable lower surface should be somewhat larger in area, but the region that is active at any position of the bucket in the comparison process is in principle no larger than the one-eighth inch diameter upper surface 25 with which it is congruent on the light detector. In a practical embodiment, the optically active region on the lower portion of the bucket moves a fraction of an inch — normally less than a quarter of an inch — up and down (X) and to the left and right (Y) over the bucket base as the bucket crosses the eight inch viewing window.

When the surfaces 24 and 25 are polished optical flats and are mutually parallel, small motion in the X,Y plane of the optically active surface 24 relative to the base of the bucket do not introduce appreciable error. The reason for this is that all portions of the object surfaces 24, 25 return to the photomultiplier 23 the portions of the outgoing beams which impinge thereon. As specular mirrors, these object surfaces ideally introduce no image, distortion or focusing effect of their own, but rather return the image of the laser source back to the photomultipliers. Assuming substantial phase incoherence as one traverses the X dimension of the fan beam, the light detection system senses congruence only in those regions of the reflected fan beams having the same X dimension. (The operation would, of course, not be adversely affected by perfect cylinder elements.)

The photomultiplier operates quite satisfactorily even though the region of the photocathode beingused at any particular moment is small and even though the spot sweeps back and forth within the slot in the mask 29 at the frequency of turbine wheel rotation.

In practice, the electrical indication of motion may take several forms. As illustrated in FIG. 1, if one is desirous of measuring the frequency of vibration of the turbine bucket and the amplitude of that vibration, the selector switch 31 is moved to the uppermost position which couples the output of the photomultiplier 23 to a PM receiver 32 tuned to 59 megahertz. The output of the PM receiver is then fed to an oscilloscope properly synchronized with the periods of the time that the desired turbine bucket passes through the fan beam. The oscilloscope will show a regular oscillatory waveform at the center of the screen with a somewhat erratic waveform proceeding and following it. The central waveform will indicate by its frequency the frequency of vibration of the turbine bucket in the Z dimension and after calibration, the amplitude of the central a.c. component will indicate the magnitude of the turbine bucket distortion. In a practical case, the signal to noise threshold is in the vicinity of 0.02 millionths of an inch of displacement, and clear indications of the magnitude of the displacement may be seen at about 0.2 millionths of an inch.

The oscilloscope 33 may be directly calibrated for measurement of bucket displacement by use of the spectrum analyzer 34, normally with a mechanical vibrator of appropriate frequency and adjustable excitation. As indicated, motion of the bucket produces phase modulation of the reflected light with a typically 200 – 500 kilohertz bandwidth centered at the heterodyne frequency established by the Bragg modulator. At the turbine bucket, the phase of the laser beam ($\phi_s$) is shifted with turbine bucket vibration in an amount proportional to the deflection and at a frequency corresponding to the bucket vibration frequency ($\omega_s$).

Assuming that the base of the bucket is stationary and that the tip motion is equal to the bucket vibration amplitude, the instantaneous Doppler shift ($\omega_d$) produced by the bucket motion may be expressed as $$\omega_d = d\ \phi_s/dt = 4\pi\ S\ \omega_s/\lambda_L\ \cos\omega_s\ t$$

where S is the relative surface displacement in centimeters and $\lambda_L$ is the light wavelength of the laser.

The moving bucket produces a number of individual modulation terms, three of which are displayed on the screen of the spectrum analyzer 34 shown in FIG. 1. The central term, which is pictured as of slightly larger amplitude than the adjacent terms, corresponds to the carrier, while the adjacent terms correspond to the first upper and first lower sidebands. The frequency separation of these sidebands from the carrier equals the 10 kilohertz vibration frequency. Under most conditions of operation, observable sidebands will exist at 10 kilocycle intervals throughout the 200 – 500 kilohertz spectrum. The line structure indicated in the drawing is illustrative of rotational displacement of the vibrating bucket, the discrete lines being spaced at the frequency of wheel rotation, typically from 10 – 60 hertz. The dwell time of a bucket in the fan beam per wheel rotation determines the number of discrete lines in each modulation term.

In calibration, a Bessel function plot of the first kind is employed since it accurately characterizes the modulation terms. (See Terman Radio Engineering, 3rd Edition, McGraw-Hill, pages 483–491) In a preferred mode of calibration, an electrically driven vibrating mirror is placed at the object position in the laser beam with the spectrum analyzer 34 operating. The vibrator excitation is increased until the spectrum analyzer display shows the first sideband terms at an amplitude equal to that of the carrier term. Referring to a Bessel chart (for functions of the first kind), this condition corresponds to a modulation index of 1.4 radians (peak). In other words, when the phase modulation is ±1.4 radians peak, the Bessel chart shows that the carrier and sideband amplitudes are equal. At the wavelength of a Helium/Neon laser (6328A), a suitable source for this application, 1.4 radians corresponds to 5.5 microinches of peak to peak deflection.

p-p deflection in microinches = 1·4/2 π· 6328A = 1411A = 5.5 microinches.

This quantity may be used to calibrate the oscilloscope 33. A convenient measurement range for the apparatus is from about 0.2 microinches to 50 microinches. Assuming a 5 inch oscilloscope, one may use the 5.5 microinch peak to peak vibration to set the oscilloscope for 1.1 centimeter deflection. Thus, a full scale deflection of 10 centimeters would correspond to 50 microinches of deflection.

The foregoing mode of oscilloscope calibration does not require that the displacement itself be measured directly or "gauged." The measurement depends upon the accuracy of the Bessel functions expressive of the phase modulation process, which for small displacements and linearly sinusoidal vibrations is of good accuracy.

One can also employ other vibration settings than the one in which the first upper and lower sideband are set equal to the carrier. The Bessel functions are plotted over a large range of modulation indices and also plot higher order sideband terms, giving one considerable freedom in the calibration process. In fact, if one does not wish to employ a calibrating vibrator, one may use the turbine bucket wheel for its own calibration.

If the frequency of the test calibrator differs from the fundamental frequency of the turbine bucket, the magnitude of the actual deflection may be obtained by use of a proportionality factor which is equal to the ratio between these two frequencies. If readings are taken electrically, the ratio may be accounted for by a suitable frequency sensitive network.

A perspective drawing illustrating a physical realization of the invention is shown in FIG. 4. The elements illustrated in FIG. 4 which are also shown in FIG. 1 have retained the same reference numerals. The optical equipment is supported upon a flat, rigid base 41 whose dimensions are 47 inches × 20 inches × 2¼ inches. The base is made of ⅛ inches aluminum panels bonded through a 2 inch honeycomb, closed at the ends with 2 inch bar stock, and provided with several stiffeners of the same material. The optical components are mounted upon the base 41 centered at 6 inches above it. The laser 11 is mounted and shimmed so as to make the axis of the laser parallel with the top of the base plate. The positions of the other elements are referenced to the laser position.

The optical elements 12, 13, 14, 15 and 16 are supported upon a common mount 42 which is attached to the top surface of the base plate and which may be translated about its original position. The corner reflectors 12 and 16 are provided with cylindrical mounts each clamped through a split ring mechanism 43, 44, respectively, permitting their rotation and axial displacement. The reflector 16 is provided with an additional adjustment comprising a tripod screw mounting assembly 45 permitting the outgoing beam which impinges upon the reflector 17 to be raised and lowered (X dimension adjustment) and swept horizontally (Y dimension adjustment). The cylinder lens 13 is supported upon the mount 42 by screws in elongated slots 47 permitting adjustment of the position of the focal plane and for setting the plane of the lens in a perpendicular position. The Bragg modulator 15 is mounted upon a horizontal base plate 48 in turn mounted upon support 42. The support permits adjustment of the Bragg angle by means of adjusting screws 49. This adjustment is relatively critical and is readily accessible.

The reflector 17 and the mirrors 19, 20, 21 and 22 are jointly supported upon a large common bracket 46, which bracket is slidably supported upon the base 41. The reflector 17 (not shown in FIG. 4) is attached to the support bracket 46 and once mounted on the bracket 46 is not subsequently adjusted. The mirrors 19, 20, 21 and 22 forming a periscope-like optical assembly, which are mounted on the bracket 46, are provided with several adjustments. The mirror pair 19, 21 are of unitary construction and are fixed to the mount 46 while the outer mirrors 20, 22 are movable. The two outer mirrors 20, 22 are provided with a ball joint at the upper and lower extremities. The lower extremities of the mirrors may each be translated in the X-dimension. by means of screw adjustments 50 which are available at the lower portion of the mount. The upper portions of the mirrors can be tracked with the lower adjustment, but may also be independently adjusted over a small circular range. Precise adjustment for rotation about the vertical (X) axis is achieved by means of a micrometer screws 51, 52.

The collimating mirror 18 is provided with a separate mounting bracket 53 slidably supported upon the base plate 41. It is also provided with means to establish it in a perpendicular position.

The photomultiplier 23 is also provided with a separate mount, which permits lateral and axial adjustment.

In order to retain a high degree of rigidity the mounts are made of substantial material and are strongly braced as generally illustrated. The optical elements, and particularly the larger lenses and mirrors are of heavy construction compatible with the interferometric accuracy. The lens elements 20, 22 are approximately 1¼ inches square in cross-section. The elements 19, 21 are cut from a similar sized glass blank and are unitary.

The mirror 17 is about an inch square in cross-section and the mirror 18 is approximately 1½ inches thick.

The preferred embodiment of the invention employs a Bragg modulator in which the laser beam initially passes through the Bragg modulator where it is split into two beams directed to the moving object surfaces and where both beams return through the modulator. When this double passage occurs, the heterodyne frequency terms created in the photodetector are at twice the frequency of the bragg modulator and its driving oscillator. Since both devices are likely to leak some radio frequency energy into the sensitive detection apparatus, placing the signal at twice the modulator frequency has the advantage of eliminating the leakage problem. A second advantage in this mode of usage of the Bragg modulator is that it avoids the need for additional beam splitting and thus reduces the loss of light attributable to such elements. The whole system requires only one beam splitter.

In the event that radio frequency leakage is not a problem or that the loss of additional light may be tolerated, one may use a comparator system in which the initial beam passes through the Bragg modulator only once. The Bragg modulator then separates the outgoing beam into two parts, but two additional beam splitters will normally be required for directing the return beams from the two object surfaces to the photodetector.

A third variation is also possible in which an additional beam splitter is provided to separate the beams for the two object surfaces prior to application of one outgoing beam to the Bragg modulator. While this arrangement is also workable, its requirement for an additional beam splitter, which further halves the light utilization, is less desirable from that point of view than the second variation.

In the foregoing arrangements, the apparatus will retain its insensitivity to random translations of the object along the path of the two parallel output beams as a consequence of the comparison action. The fan configuration of the individual beams works equally well in these configurations, permitting the optical system to retain its accuracy of vibration measurement as the object is translated through the breadth of the paired beams.

The comparator does, however, require substantially specular reflection on the part of the object surfaces employed, and while one and sometimes both of these surfaces may be quite small, both should be mutually parallel and oriented substantially orthogonally to the individual parallel beams. In metallic objects, small surfaces may usually be ground for measurement. One can also attach small mirrors on irregular object surfaces.

I claim:

1. Apparatus for optically comparing the relative motion of one flat reflective surface on an illuminated object in respect to another substantially parallel flat reflecting surface in a direction perpendicular to said surfaces, while said illuminated object is moving a substantial distance in a direction orthogonal to the beams incident on said surfaces, said apparatus comprising:
 a. a light modulator comprising means for generating travelling sonic compression wavefronts in a light transmissive medium, said sonic wavefronts deflecting monochromatic light at grazing incidence by twice the angle of incidence and shifting the frequency of the deflected light, a portion of the light crossing through said wavefronts without said deflection not experiencing a frequency shift,
 b. a source of collimated coherent illumination directing a beam into said modulator at glancing incidence upon said sonic wavefronts to form a first deflected, frequency shifted beam, and a second non-deflected, non-frequency shifted beam,
 c. a first cylinder lens for spreading the illumination from said source to widen said first and second beams in a direction orthogonal to the plane defined by said two beams,
 d. a common optical element for collimating both widening beams at a width to permit object illumination over said orthogonal distance,
 e. means to direct said frequency shifted first beam into perpendicular incidence with one of said reflective surfaces to effect an additional frequency shift resulting from its motion and to cause the reflected beam to return back upon itself,
 f. means to derive a second beam from said source substantially in parallel with said first beam and directed into perpendicular incidence with the other of said reflective surfaces to effect a frequency shift resulting from its motion and to cause the reflected beam to return back upon itself,
 g. optical means to direct said return beams into a common path, and
 h. light detection means disposed in said common path for recovering the optically heterodyned electrical signal corresponding to the light modulation frequency terms mixed with the surface motion frequency terms.

2. Apparatus as set forth in claim 1 wherein
 a. said means to derive said second beam employs said non-deflected beam from said light modulator, and
 b. said first cylinder lens is disposed between said source and said light modulator.

3. Apparatus as set forth in claim 2 wherein
 a. said light modulator increases or decreases the frequency of the deflected light dependent upon whether the light impinges on the fronts or backs of said sonic wavefronts,
 b. said modulator directs said return beams into two common paths, both of said reflected return beams entering said modulator in a sense reversing the mode of impingement on said sonic wavefronts to split each of said return beams into a deflected and a non-deflected component, one component from each return beam coinciding in a front common path in a non-deflected, axial position, and one component from each return beam coinciding in a second common path deflected from said axial position, and
 c. said light detection means are disposed to select the components in one of said common paths and to derive heterodyne components at twice the light modulation frequency.

4. Apparatus as set forth in claim 3 wherein
 a. said first cylinder lens is in close proximity to said modulator so that said spreading beam is of small cross-section as it passes through said modulator and wherein
 b. said common collimating element is a concave parabolic mirror of high quality, said two separated beams being disposed approximately symmetrically about the center of said mirror so that adjacent portions of the beams experience substantially like wavefront distortions from impingement on adjacent mirror surfaces when going toward and returning from said object surfaces.

5. Apparatus as set forth in claim 4 having in addition thereto a beam splitter disposed between said first cylinder lens and said modulator and oriented to reflect the return beams passing through said modulator into said detection means without passing through said cylinder lens to avoid further aberration of said return beams.

6. Apparatus as set forth in claim 1 having in addition thereto means for adjusting the spacing between said widened beams to correspond with the spacing between said moving object surfaces, comprising two symmetrically disposed translatable mirror pairs oriented in periscope fashion at approximately 45° to said first and second beams.

7. Apparatus as set forth in claim 1 for vibration study wherein the frequency shift by said modulator is made large with respect to the frequency shift obtained by said moving surfaces to remove ambiguity between forward or reverse vibration components and establish a heterodyne frequency wherein the bandwidth of the surface displacement frequency terms is a small percentage thereof, convenient for amplification.

8. Apparatus as set forth in claim 7 wherein an oscilloscope is provided coupled to said light detection means for indicating the amplitude and frequency of vibration of said object.

9. Apparatus as set forth in claim 7 wherein a spectrum analyzer is provided coupled to said light detection means for indicating the relative vibration amplitudes of separate modulation terms and thereby the amplitude of vibration.

* * * * *